(12) United States Patent
Guarneri (10) Patent No.: US 11,023,075 B2
(45) Date of Patent: Jun. 1, 2021

(54) METHOD AND DEVICE FOR SENSING OPERATING CONDITIONS OF A TOUCH SCREEN, CORRESPONDING APPARATUS AND COMPUTER PROGRAM PRODUCT

(71) Applicant: STMICROELECTRONICS S.R.L., Agrate Brianza (IT)

(72) Inventor: Nunziata Ivana Guarneri, Caltanissetta (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 0 days.

(21) Appl. No.: 14/973,444

(22) Filed: Dec. 17, 2015

(65) Prior Publication Data
US 2016/0259448 A1 Sep. 8, 2016

(30) Foreign Application Priority Data
Mar. 6, 2015 (IT) .......................... TO2015A000154

(51) Int. Cl.
  *G06F 3/044* (2006.01)
  *G06F 3/041* (2006.01)
  *G06F 3/0354* (2013.01)

(52) U.S. Cl.
  CPC ...... *G06F 3/04166* (2019.05); *G06F 3/03545* (2013.01); *G06F 3/044* (2013.01); *G06F 3/04186* (2019.05); *G06F 3/0446* (2019.05); *G06F 2203/04104* (2013.01)

(58) Field of Classification Search
  CPC .................................................... G06F 3/044
  See application file for complete search history.

(56) References Cited

U.S. PATENT DOCUMENTS

| | | | |
|---|---|---|---|
| 8,982,097 B1 * | 3/2015 | Kuzo ................... | G06F 3/0418 345/174 |
| 2008/0136792 A1 * | 6/2008 | Peng .................... | G06F 3/0416 345/174 |
| 2011/0001708 A1 | 1/2011 | Sleeman | |
| 2012/0249470 A1 | 10/2012 | Sugiura et al. | |
| 2012/0268411 A1 | 10/2012 | Chen et al. | |

(Continued)

OTHER PUBLICATIONS

Pierre Geurts et al., "Supervised learning with decision tree-based methods in computational and systems biology," Department of EE and CS & GIGA-Research, The Royal Society of Chemistry, University of Liege, Belgium, 2009, 10 pages.

*Primary Examiner* — William Boddie
*Assistant Examiner* — Andrew B Schnirel
(74) *Attorney, Agent, or Firm* — Seed IP Law Group LLP (57) ABSTRACT

A capacitive touch screen of e.g., a mobile communications device such as a smart phone or tablet is operated by producing a capacitance map of capacitance values for the screen, wherein the capacitance values are indicative of locations of the screen exposed to touch by a user, and by identifying locations of the screen exposed to touch by a user by comparing the capacitance values against settings of sensing thresholds. Descriptor processing is applied to the capacitance map to extract a set of descriptors indicative of said screen being in one of a plurality of different operating conditions. A set of rules is applied to these descriptors to identify one of a plurality of different operating conditions, and selecting the setting of sensing thresholds as a function of the operating condition thus identified.

14 Claims, 4 Drawing Sheets

(56) References Cited

U.S. PATENT DOCUMENTS

| | | |
|---|---|---|
| 2012/0274604 A1 | 11/2012 | Norton et al. |
| 2013/0176268 A1 | 7/2013 | Li et al. |
| 2013/0278543 A1 | 10/2013 | Hsu et al. |
| 2014/0111472 A1* | 4/2014 | Lee .................. G06F 3/044 345/174 |
| 2015/0268802 A1* | 9/2015 | Kim .................. G06F 3/0482 715/763 |

* cited by examiner

METHOD AND DEVICE FOR SENSING OPERATING CONDITIONS OF A TOUCH SCREEN, CORRESPONDING APPARATUS AND COMPUTER PROGRAM PRODUCT

BACKGROUND

Technical Field

The description relates to touch screen sensing techniques.

One or more embodiments may apply to capacitive touch screens.

Description of the Related Art

Devices equipped with touch screens are oftentimes used in the rain, with wet or sweaty fingers, or in humid environments that may cause condensation.

While touch screens may be expected to operate correctly in all these conditions, water/humidity on the surface may significantly affect performance of a touch screen in a variety of ways e.g., by leading to phantom touches or adversely affecting accuracy. Water/humidity may corrupt the mutual capacitance system of the touch screen to the point of requiring a hard reboot. In certain cases, the screen may even freeze or become completely non-responsive when a user tries to wipe it clean of water.

Managing a device in a critical moisture environment or with a wet panel is a challenging issue for the touch controller industry and, as such, has been extensively investigated in the art.

For instance, US 2012/0268411 A1 discloses a graphical interface which drives the user in the manual selection of a specific device working mode.

Document US 2012/0249470 A1 proposes a solution which performs wet detection through an analysis of the shape of the conductive element.

Document US 2012/0274604 A1 discloses a hardware setup for detecting the presence of moisture over a panel.

Also, even in the case of water tolerant devices, multi touch operation may not be feasible for a wet display. Operating systems expected to be actuated via touch screens may be able to support e.g., four finger touch and beyond, so that true ghost-free multi-touch may be an asset in smart phones and the like even if in wet conditions. Such a type of operation may be supported by resorting to two different chips, one for self-capacitance and one for mutual capacitance.

BRIEF SUMMARY

In the scenario outlined in the foregoing, touch screen controllers capable of overcoming the drawbacks are discussed in this disclosure.

One or more embodiments may relate to a corresponding device and apparatus (e.g., a mobile communications device such as a smart phone or a tablet) including such a device as well as to a computer program product loadable the memory of at least one processing device and including software code portions for executing the steps of the method when the product is run on at least one computer. As used herein, reference to such a computer program product is understood as being equivalent to reference to a computer-readable means containing instructions for controlling the processing system in order to co-ordinate implementation of the method according to the disclosure. Reference to "at least one processor device" is intended to highlight the possibility for the present disclosure to be implemented in modular and/or distributed form.

The claims are an integral part of the disclosure of one or more exemplary embodiments as provided herein.

One or more embodiments may involve differential signal analysis, which makes it possible to detect a wet condition and wet multi touches by using mutual sensing only.

One or more embodiments may permit to provide effective waterproofing of a mobile communication device by overcoming the limitation to single touch operation and supporting multi touch detection in case of wet conditions.

One or more embodiments may facilitate wet multi touch detection by using mutual sensing only.

One or more embodiments may offer one or more of the following advantages:

continuous scanning between self and mutual sensing can be avoided, thus reducing power consumption;

a second chip for self-sensing may be dispensed with;

applicability to a wide variety of mobile devices equipped with a projected capacitive (P-cap) touch screen.

BRIEF DESCRIPTION OF THE DRAWINGS

One or more embodiments will now be described, purely by way of non-limiting example, with reference to the annexed figures, wherein.

DETAILED DESCRIPTION

In the ensuing description one or more specific details are illustrated, providing an in-depth understanding of examples of embodiments. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the scope of protection or the scope of the embodiments.

Figure 1:
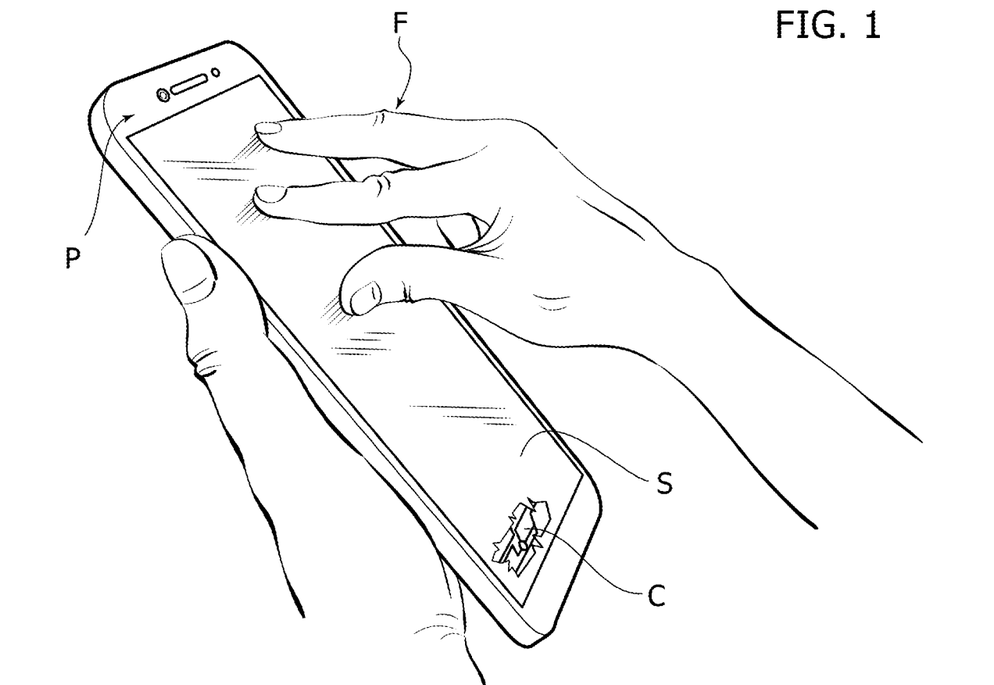
FIGS. 1 and 2 are schematic representations of possible modes of use of a mobile communications device.
Figure 2:
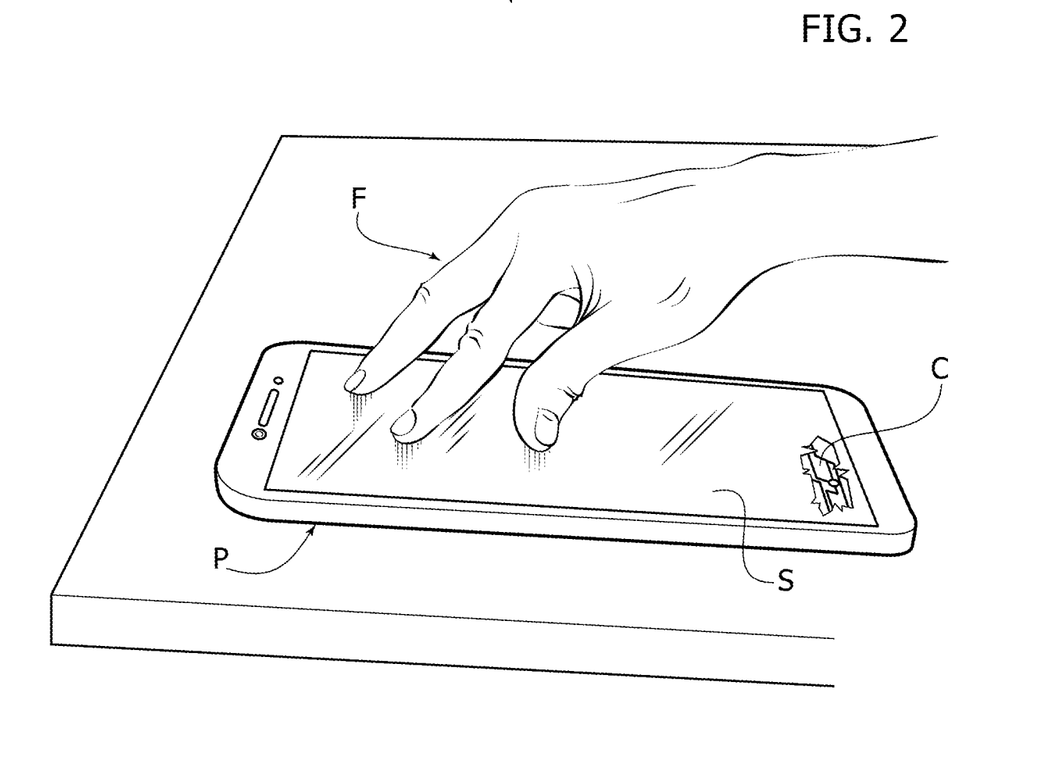

FIGS. 1 and 2 are schematic representations of two possible modes of use of a mobile communications device such as e.g., a smartphone P, e.g.:

a "grip" mode, with the device P held e.g., by a user's hand (FIG. 1), a "float" mode, with the device P resting on an (electrically) insulating surface (FIG. 2).

A mobile device P as exemplified herein may be equipped with a "touch screen" display/control panel S, so that the user may operate the device by placing one or more fingers F onto the panel - - - or in close proximity thereof: consequently, while prevailing in the art, the designation "touch" screen as used herein is not intended to be limited to actual physical finger contact with the screen but also covers e.g., "hovering" or "glove" operation.

Today, projected capacitive (P-cap) touch screens are extensively used in mobile devices. Despite extensive use and the ability for a wet screen to detect and manage a single touch, multi touch detection (e.g., the capability for the screen to sense plural fingers) when the screen is wet is not a currently available feature.

Wet single touch detection may rely on certain basic features of P-cap technology, which may involve two different ways of sensing touch.

Capacitive sensing, as used e.g., in touch screens, works because humans are conductive. Water, such as tap water or "impure" water such as e.g., coffee, is also conductive and this causes error in the capacitive measurement.

Projected capacitive technologies detect touch by measuring the capacitance at each addressable electrode of a screen (e.g., the display panel of a mobile communications device).

A finger or a conductive stylus approaching an electrode may produce a "perturbation" in the electromagnetic field and vary the associated capacitance. This change in the capacitance may be detected electronically by electronic circuitry C associated with the screen S and then converted into space locations (e.g., X, Y coordinates of a notional Cartesian plane defined by the screen) that the device can use to detect touch.

Such an approach may lie at the basis of two main types of sensing methods, e.g., self-capacitance and mutual capacitance.

In self-capacitance (self-cap, FIG. 3), the electronics C associated with the sensing screen S may detect and measure the current to the ground on each electrode.

To sense touch in a self-capacitance implementation, the electronics C associated with the sensing screen S may scan through each electrode and measure the amount of current on each electrode to establish a steady-state current. When a finger or grounded conductive stylus approaches the screen, they couple to the electrodes and increase the current draw by creating a path to ground. Which row and column is closest to the touch location (e.g., X1, Y0 and X3, Y2 in FIG. 3) may then be determined, and using interpolation for higher precision e.g., a controller can determine the location of touch.

Figure 4:
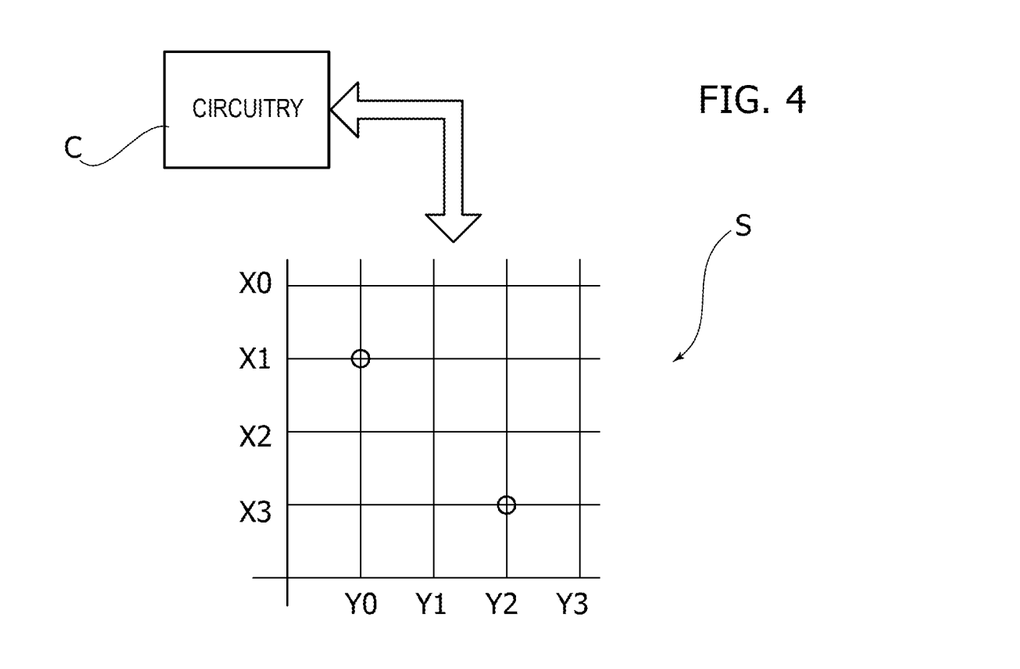

In mutual capacitance (mutual cap, FIG. 4), projected capacitance touch screens create mutual capacitance between elements of columns and rows in the vicinity where each intersect the other. The electronics C associated with the sensing screen S may then detect and measure each node (intersection) individually to detect multiple touches on the screen during one screen scan. When a finger (or stylus) approaches an intersection, some of the mutual capacitance between the row and column is coupled to the finger which reduces the capacitance at the intersection as measured by the system electronics C. A touch may then be indicated to occur (e.g., again at X1, Y0 and X3, Y2 in FIG. 4) when a "touch threshold" set by the electronics C is reached.

For instance, due to the high dielectric constant of water ($\varepsilon_r=80$ compared to $\varepsilon_o=1$ for air) the static capacitance between the sensor plates and surrounding ground may increases significantly. In the case of mutual sensing, water strengthens the fringe field between adjacent sensors and increases capacitance. Depending on the touch screen overlay thickness and dielectric, this may cause the capacitance to change enough to be detected by the circuitry C as a light finger touch and cause false touches. For that reason, mutual sensing may not be regarded as an effective way of managing water.

The concepts outlined in the foregoing are well known in the art, thus making it unnecessary to provide a more detailed description herein.

It was observed that each of these two types of sensing may show both advantages and disadvantages.

Self-capacitance has a high sensitivity to touch, and may be used, for instance, in hovering and glove applications (e.g., without actual physical finger contact with the screen). It is characterized by a low resolution and may be exposed to the presence of "ghost points" when more than one finger touch the screen.

Figure 3:
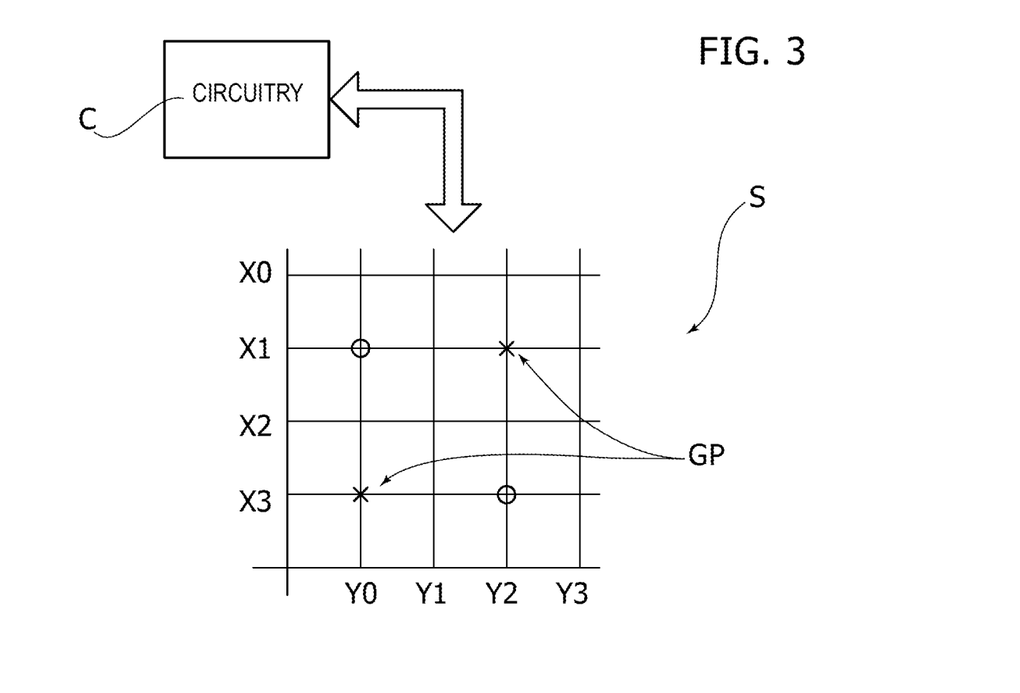
FIGS. 3 and 4 are schematic representations of the underlying principles of self-capacitance and mutual capacitance sensing in touch screens.

An example of ghost points GP is shown in FIG. 3. The example shows what is in fact a double touch at X1, Y0 and X3, Y2 erroneously revealed as a four-finger touch, since the electronics C associated with the screen S reads two high values for the rows (at X1 and X3) and two high values for the columns (at Y0 and Y2) and is not able to correctly associate the X and Y coordinates with the touches.

In comparison with self-capacitance, mutual capacitance may exhibit a lower sensitivity and a higher resolution. Also, it is not exposed to ghost touches because the electronics C associated with the screen S reads exactly at the intersection of each row and column.

These two sensing approaches are also affected differently by wet conditions. For that reason, they may be both used in order to reveal water presence on the screen panel in connection with single finger touch e.g., only one finger touching the screen.

For instance, water resistance may be achieved by using both mutual-cap and self-cap sensing by operating a touch panel in both modes by switching back and forth between them, e.g., self-capacitance (using only the top electrode layer) and mutual capacitance (using both electrode layers). Self-capacitance may be largely unaffected by water, while mutual capacitive sees water as touch. An entry wet condition may be detected by detecting a variance of capacitances from mutual-cap sensing and, at the same time, by reading no changes from self-cap sensing.

Once water on the screen panel is revealed, the electronics associated with the screen may read data only from self-sensing, with the proviso that only single touch wet operation will be properly managed due to the possible occurrence of ghost points in case of multiple touch (see FIG. 3).

In brief, self-cap sensing works well in the presence of water but does not support true multi-touch operation. Conversely, mutual cap sensing may support multi-touch operation, but may become critical in the presence of water.

One or more embodiments are directed to providing a device equipped with a projected capacitive (p-cap) touch screen to perform multi touch sensing also in the case of a wet display, possibly by only using mutual sensing by taking into account the fact that devices equipped with P-cap technology touch screen may admit the two different modes of use illustrated in FIGS. 1 and 2.

When hand held in the grip mode of FIG. 1, the device P may be well grounded, so that any increase in the sensing current during sensing may be at least slightly higher than expected, due to the additional flow path made available for the sensing current: the electrons in a sensing current flowing through a user's finger will be affected by the electrical field emitted by the matrix lines, and also by the field emitted by the user's body itself: when touching the casing of the touch screen the conductance of the user's body will extend the field of the casing to the user's fingertip, and an additional flow path for the AC-current will formed through the user's body.

In the case of the float mode of FIG. 2, with the device P touched by fingers while placed on an (electrically) insulating surface, the device P will not be well grounded, and a weaker touch signal will be produced in comparison to the grip operative mode.

Also, this different behavior may be affected by the design of the sensor.

One or more embodiments may involve wet p-cap touch screen operation based on mutual-cap sensing data only. Such an approach may offer device designers different choices in terms of electronics design, while allowing a reduction of power consumption due to the possibility of dispensing with a check on the self-sensing data.

One or more embodiments may permit the detection of wet multi touch by overcoming the disadvantages of those touch controllers which may reveal only a single wet touch by reading self-cap data due the intrinsic difficulty of avoiding false touch conditions in the case of a wet (e.g., display) screen: even if self-cap data are notionally "immune" to the possible presence of water, they may be affected by ghost points, which may not allow to detect a multi-touch.

It was observed that, e.g., mutual capacitive data relative to two fingers moving over a wet panel may exhibit two larger "bells" relative to finger touches, and lower bells relative to zones of the panel gone through by the fingers during their tracking.

These ghosts are due to an increase of the fringe field and a consequent increase of capacitance between adjacent sensors. In these conditions, the electronics C associated with the touch screen S may not be able to discriminate real touches over false touches.

One or more embodiments may be able to reveal a "wet" condition, both for untouched water on the screen panel and for wet fingers tracking over it. One or more embodiments, once the wet condition is detected it is possible, may permit e.g., to select a new setting of thresholds which may be used in order to avoid false touch detections and facilitate correct finger touch position detection. By overcoming the false touch issue, one or more embodiments may benefit from the main feature of mutual sensing, that is the capability of providing multi-touch detection.

By way of simple explanation, one may consider the possibility of configuring (in a manner known per se) the electronics C associated with a touch screen S in order to be able to operate with two thresholds, Th1 and Th2, where:

Th2 is a default threshold used to detect finger "bells" in a dry operative mode, and in case of wet display such a threshold Th2 may be exposed to the detection of false touches; and Th1 is another threshold, which may be used if a wet condition is revealed with the capability of avoiding the detection of false touches.

In brief, one or more embodiments may adopt an adaptive threshold mechanism which may overcome the problem of false touch detection in case of wet display by reading "mutual" data only.

In one or more embodiments, such an adaptive threshold mechanism may be made possible by classifying the condition of the screen panel (e.g., dry and untouched, wet and touched by more fingers, dry and stylus etc.).

In one or more embodiments, such a classification of the condition of the touch screen may rely on the recognition that the screen capacitors (that is the sensitive elements of the screen) may be arranged in a patterned layout such as e.g., a matrix layout, and that mutual sensing provides for reading a value for each intersection of rows and columns, so that a corresponding "map of capacitances" (e.g., the total capacitor matrix values) may become available with the electronics C associated with the screen S.

In one or more embodiments, a classification procedure may be performed for the map of capacitances detected, e.g., at the beginning of the touch processing pipeline (possibly after a noise pre-processing step), in order to be able to drive all the successive steps in pipeline processing to finger/stylus island extraction and at the estimation of the (x,y) relative coordinate pairs.

Figure 5:
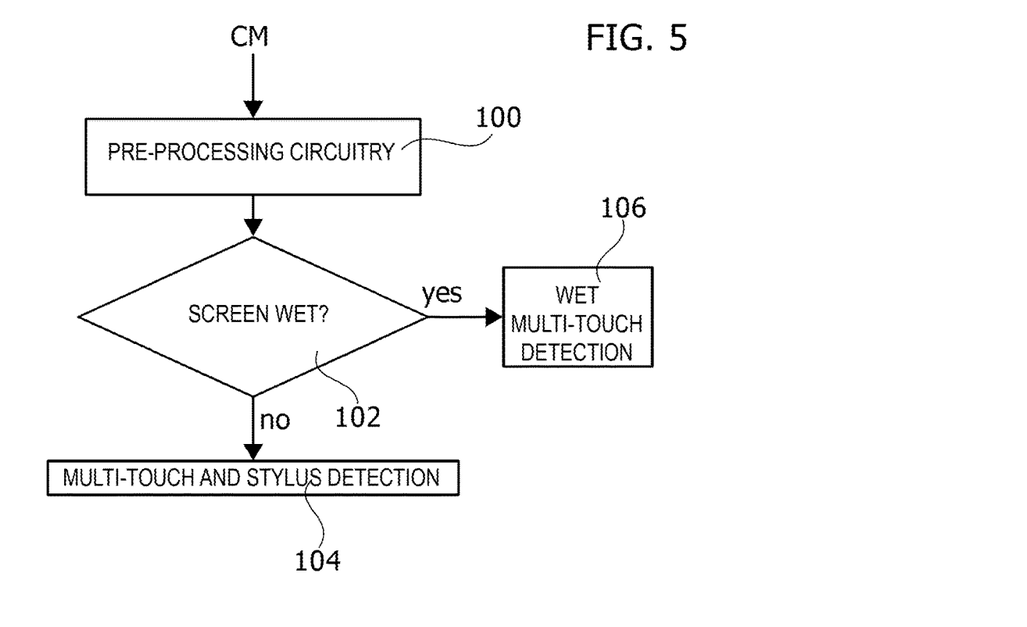
FIG. 5 is a flow chart representing an underlying principle of embodiments.

The flow chart of FIG. 5 is generally exemplary of such an approach. There, the block 100 is exemplary of possible (per se non mandatory) pre-processing such as e.g., noise-filtering of the capacitance map CM generated in a manner known per se, e.g., via mutual capacitance sensing.

In a subsequent step 102 a check may be performed as to the condition of the screen, in order to distinguish between e.g., a "dry" condition (e.g., negative outcome of the step 102) and a "wet" condition (e.g., positive outcome of the step 102), indicative of the presence of water, moisture humidity, sweat and so on. This can detect the presence of "untouched water" and "touched water," such as when fingers move on a wet panel.

In one or more embodiments the check of step 102 may be performed on the basis of mutual capacitance data only (and not on both mutual capacitance and self-capacitance data).

In one or more embodiments, this may permit wet multi-touch detection while avoiding to continuously check both mutual capacitance and self-capacitance data to verify if untouched water is present on the screen panel (which e.g., may mean no data variation on the self-capacitance map and a variation on the mutual capacitance map).

It was observed that if water is present the possibility exists of using only self-capacitance to reveal one touch. However, such an approach may be ineffective for other "wet" conditions, e.g., no untouched water on the screen, yet with wet fingers moving on the screen. Such a wet condition may not be detected early (because e.g., both the maps, "mutual" and "self", show a variation of capacitances) and the electronics C associated with the screen S continues to use the mutual capacitance maps for finger detection, which may lead to incorrect results (e.g., due to false touches). In such a contingency, the electronics C associated with the screen S will be able to detect a wet condition (e.g., the water puddle left by the fingers on the screen switches at the entry wet condition) only after fingers are removed from the panel. In that case, it will however be too late to recover a correct device functionality, with the possibility that a reboot may become necessary.

In one or more embodiments, a "dry" condition (e.g., a negative outcome of the step 102) may lead to sensing with mutual capacitance data, thus permitting multi touch and stylus detection (block 104).

In one or more embodiments, a "wet" condition (e.g., a positive outcome of the step 102) may lead to sensing being performed again with mutual capacitance data, thus permitting multi touch (up to 5 wet fingers) detection (block 106).

One or more embodiments may rely on a classification of different types of panel conditions, which may include, e.g., a plurality of wet and dry conditions (with single and multi-touch operation) in two different operative modes such as e.g., float and grip (see FIGS. 1 and 2).

In one or more embodiments, such a classification may be based on a set of features computed (only) on mutual data, so that once an e.g., wet condition is verified, multi-touch detection is permitted.

For instance, one or more embodiments may have the capability of distinguishing wet and dry conditions in the float and grip operative modes, so that different settings of parameters may be adopted in case of float (wet or dry) or grip (float or dry) leading e.g., to a more robust device behavior in case of wet panel.

In one or more embodiments, the classification mechanism considered in the foregoing may permit to discriminate, both for grip (FIG. 1) and float (FIG. 2) conditions, multiple touches (multi-touches) in the cases of dry and wet screen and the case of untouched water (drops or spray) by using mutual capacitance data only.

In one or more embodiments, this may occur e.g., on the basis of the following taxonomy:
- grip wet multi-touch (wet fingers—grip);
- float wet multi-touch (wet fingers—float);
- grip dry multi touches or stylus (dry fingers/stylus grip);
- float dry multi touches or stylus (dry fingers/stylus—float);
- untouched water (spray, drops, spray or condensation, ghosts).

One or more embodiments may consider a maximum of five fingers, but the same approach can be extended to a higher number of fingers.

Figure 6:
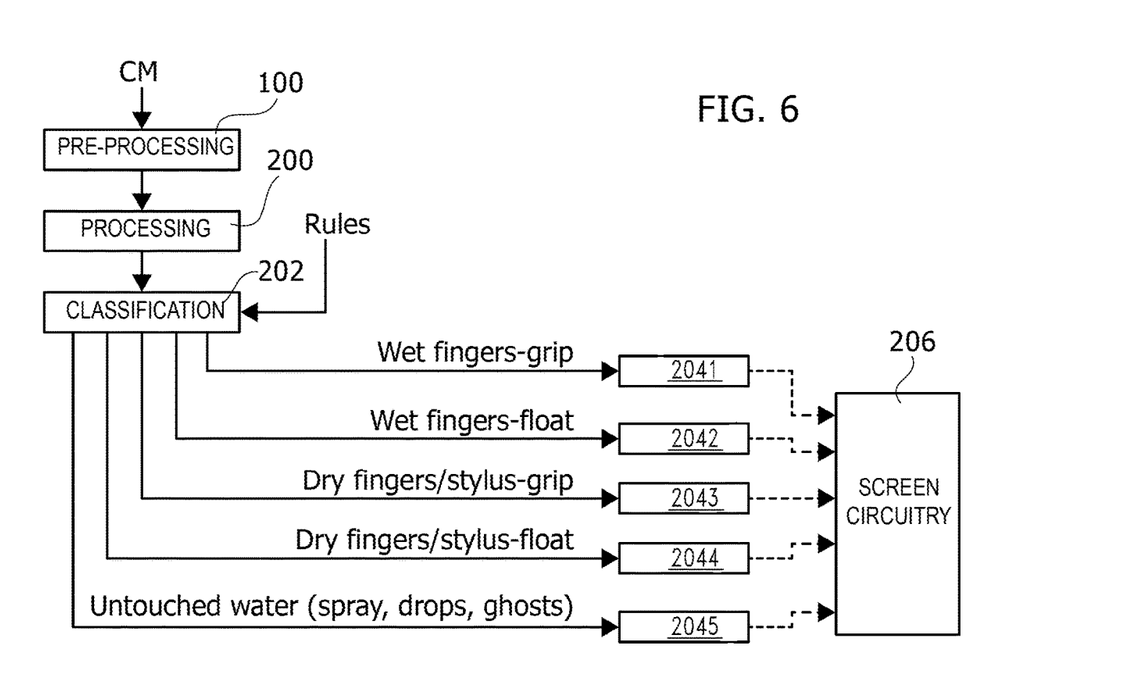
FIG. 6 is a functional block diagram illustrative of operation of embodiments.

One or more embodiments may operate according to the basic layout exemplified by the functional block diagram of FIG. 6, which may be implemented e.g., in software form in the electronics C associated with the screen S.

Input to the process may be the (mutual) capacitance map CM with possible pre-processing 100. The (possibly pre-processed) map CM may be fed to a descriptor processing block 200 and then to a classification block 202 which—based on certain classification Rules—may lead to identifying any of a plurality of screen conditions (e.g., wet fingers—grip; wet fingers—float; dry fingers/stylus grip; dry fingers/stylus—float; untouched water) as exemplified previously.

Corresponding settings 2041, 2042, 2043, 2044, 2045 may then be produced of the electronics C associated with the screen S for use in sensing as represented by the block 206.

In one more embodiments the classification 202 may be performed on the basis of a set of descriptors computed in the block 200 e.g., starting form positive and negative values of the capacitance map CM.

It was in fact observed that such positives and negatives may exhibit strong variations under all the conditions resulting from the combinations of wet, dry, grip and float, single and multi-touch or dry stylus.

For instance, a "Strength" value may be defined for the signals/data in the capacitance map CM as a function of the following difference:

Strength=Baseline−RawData where "Baseline" represents the values of capacitive sensors being in a condition of "no touch", as derived e.g., from a calibration procedure of the device (e.g., screen S plus electronics C). The "RawData" will be non zero when there is a capacitance variation due to a conductor element near or over the screen S. In case of "no touch" the strength values will expectedly be near zero.

In the case of operation in the grip mode (e.g., the device P is hand held as shown in FIG. 1), when a finger touches a dry screen panel S the raw data (RawData) will expectedly assume negative values because the electromagnetic field between adjacent capacitance sensors decreases. A negative variation in capacitance will be observed, and due to the negative sign of the raw data (RawData) the strength (Strength) will be positive.

Conversely, if one considers the behavior of Strength in a wet condition, the presence of "untouched water" on the panel will cause an increase in the fringe field between adjacent capacitors and, consequently, an increase in RawData (due to a positive variation in capacitance). Assuming that Baseline remains the same, the electronics C associated with the screen S will read negative strength values at the sensor intersections corresponding to the screen zone where water is located.

In the case of wet fingers moving on the screen panel it may be possible to observe, in correspondence of touches, a positive value for Strength (RawData will have a negative value) with higher values in comparison with the finger dry touches. This increased value may be due to the high dielectric constant of water which, coupled with the conductive capability of the user's fingers F, will determine a high reduction of the electromagnetic field between adjacent sensors. This will entail a high capacitance variation (negative), so that Strength (positive) for a wet touch relative to a finger of normal size will correspond to a large finger (e.g., a thumb) or a palm. At the same time, the effect of an increase in the fringe field will cause an increase of the negative values around the wet touch.

These variations in the positive or in the negative will be different according to i) the number of fingers and ii) the amount of water.

If one refers to the float condition of FIG. 2, where the device P may be placed over an electrically insulating surface, the reduction of the fringe field in case of touch will expectedly be lower than in the "grip" case (device P hand held as shown in FIG. 1). An explanation for this may lie in that the device may not be well grounded as in the case of the grip condition. In the case of float, the variation in capacitance will expectedly be lower, and the signal strength will expectedly be lower than in the case of the "grip" operative mode.

Also, in one or more embodiments, the float mode may show a different variation of positives and negatives with respect to the grip condition considered previously. This variation can be observed on the mutual capacitance map CM, e.g., peaks of finger "bells" may reach lower values in "float" than in "grip".

In one or more embodiments, in order to facilitate rendering the arrangement exemplified herein robust and reliable, the output of the classifier block 202 may discriminate possible wet and dry condition for both grip and float operative modes.

In one or more embodiments a set of descriptors (see the block 200 in FIG. 6) may be defined in order to discriminate e.g., among the following conditions or classes:
- untouched water on the screen S e.g., in the form of drops or spray/condensation (float or grip);
- wet fingers on the screen S (float or grip);
- dry fingers or dry stylus on the screen S (float or grip).

In one or more embodiments, classification as exemplified by the block 200 in FIG. 6 may be performed at the beginning of the touch processing pipeline (e.g., after pre-processing at 100) followed by the subsequent pipeline steps aiming at finger island extraction and the estimation of the (x, y) finger coordinate pairs estimation.

As exemplified in FIG. 6, the various classes may be discriminated by the classifier 202 by comparing descriptors values (e.g., the Strength data) against a set of Rules.

In one or more embodiments, these Rules, as possibly stored in the electronics C, may derive from an "off-line" computing step, which means that e.g., a supervised classifier may be been used.

Figure 7:
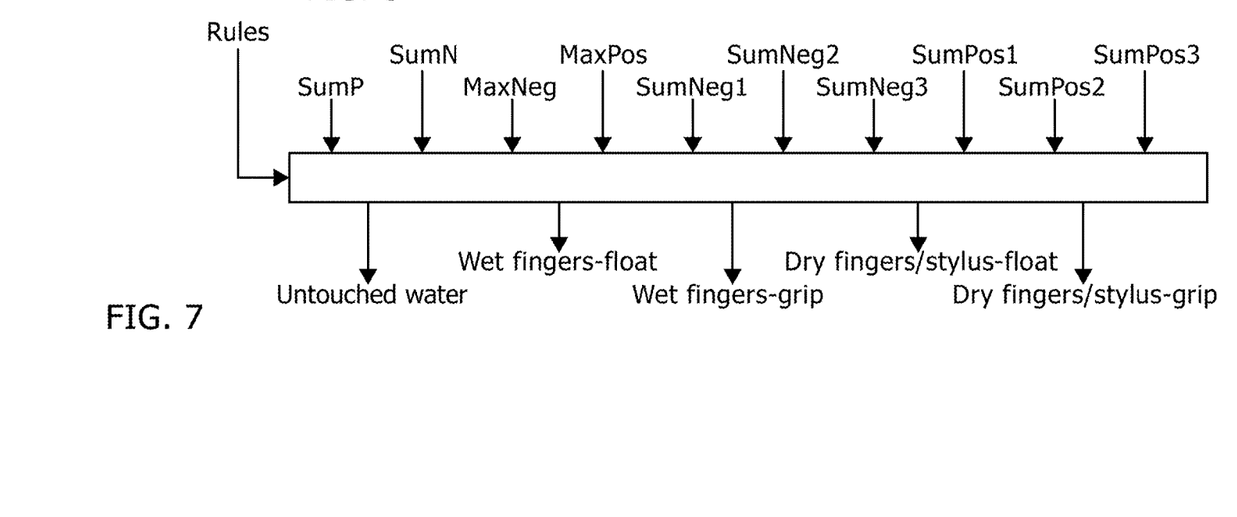
FIG. 7 is flow chart illustrative of operation of embodiments.

The flow chart of FIG. 7 is exemplary of possible processing aiming at discriminating the screen panel condition, as performed e.g., at the beginning of the sensing pipeline which may lead the electronics (controller) C to select thresholds (settings 2041 to 2045) to be applied on the mutual capacitance data CM in order to discriminate e.g., fingers from false touches.

In one or more embodiments, such processing may involve observing the variations of certain global descriptors, thus making it possible to discriminate a plurality of classes to be recognized (e.g., wet or dry, single or multi-touch).

In one or more embodiments, these descriptors may be global, that is they may be computed on the whole distribution of mutual capacitance data. In one or more embodiments, these descriptors may not take into account information relative e.g., to the shape of the conductor element touching the panel, such as the area of the "bell" produced by a finger, or the size of a water puddle, or the contour regularity of the related shapes.

In one or more embodiments, descriptor computation may not rely on any (previous) routine e.g., for shape extraction and classification. This may facilitate computation and/or contribute in providing immunity to error propagation as possibly induced by a shape recognition step.

One or more embodiments may involve descriptors which are based on a global variation of defined sub ranges of positives and negatives.

For instance (according to the global range of positives and negatives, which may depend on the number of bits used by the controller electronics C) three ranges may be selected, e.g., with symmetric (specular) positive and negative values such as b1, b2, b3 and −b1, −b2, −b3.

One or more embodiments may provide that either specific limit values are used or the extremes of the relative sub-ranges are re-fixed (adjusted), according to the device specifications such as e.g., sensor pattern, sensitivity, noise immunity etc.

In an exemplary embodiment, the descriptors may be selected out of e.g.:
maximum of positive values: maxPos;
maximum of the negative values: maxNeg;
sum of all negatives: sumN;
sum of all positives: sumP;
sum of positives in the range1: sumPos1;
sum of positives in the range2: sumPos2;
sum of positives in the range3: sumPos3;
sum of negatives in the range1': sumNeg1;
sum of negatives in the range2': sumNeg2;
sum of negatives in the range3': sumNeg3;

The following is an example of an approach for computing the sub range sums, under the assumption that the capacitive map CM is scanned from left to right and from top to bottom, so that one of the following sum values may be updated according to the magnitude (modulus) and sign of the value.

| Positive value |
|---|
| if $b_1 <$ value $< b_2 \rightarrow$ sumPos$_1$+ = value |
| if $b_2 =<$ value $< b_3 \rightarrow$ sumPos$_2$+ = value |
| if $b_3 =<$ value $< b_4 \rightarrow$ sumPos$_3$+ = value |
| Negative value |
| if $-b_1 >$ value $> -b_2 \rightarrow$ sumNeg$_1$+ = $\mid$ value $\mid$ |
| if $-b_2 >=$ value $> -b_3 \rightarrow$ sum Neg$_2$+ = $\mid$ value $\mid$ |
| if $-b_3 >=$ value $> -b_4 \rightarrow$ sumNeg$_3$+ = $\mid$ value $\mid$ |

One or more embodiments may be implemented in a device P equipped by a p-Cap touch screen S and a touch controller C of the type marketed by the Applicant company under the commercial designation ST FingerTip. Exemplary values and specific limits which may be used in such an implementation are reported below:
range of values=(−4095, +4095)
$b_1$=60
$b_2$=980
$b_3$=1960
$b_4$=3000.

While such exemplary values may be regarded as "tuned" to the specifications of the device used for the implementation, certain general rules may apply (jointly or separately) to one or more embodiments.

For instance, the limit values may be continuous/contiguous, namely the range 2 ($b_2$+1) may start where the range1 (b2) ends.

Similarly, the limits may be nearly equally distant, with the distance between one limit and the subsequent one being e.g., in the vicinity of 900/1000.

For instance one or more of the following may apply:
an exemplary value for the gap between ranges may be gap=980;
$b_3$ may be selected to be exactly $b_3$=$b_2$+gap,
the first value $b_1$=60 may be fixed e.g., above zero because the variations between 0 and 60 may be disregarded as primarily due to noise;
the exact value for $b_4$, namely $b_3$+delta=1960+980=2940, may be rounded, e.g., to 3000 (as indicated) without appreciably affecting performance level e.g., when no finger peaks with values higher than 2940 are present in the capacitive map, even in a "wet" case. More generally, in one or more embodiments that gap may be selected in such a way that e.g., range3 includes also the peak values which may be provided, both for dry and for wet finger(s), by the sensing device.

The same may apply to the negative range, but in that case only one range, e.g., the range1' may be actually used for classification purposes. The two other ranges (range2' and range3') may not be used for classification purposes. However, in certain cases they may be useful for classifying other conditions such as e.g., wet palm or cheek, a liquid different from water, and so on.

In one or more embodiments, the classifier 202 may receive a set of descriptors as an input, and then identify what rule(s) each descriptor in is compliance with. For instance, in one or more embodiments, exemplary rules may correspond to the following output classes:
1. Fingers/stylus dry grip;
2. Fingers/stylus dry float;
3. Fingers wet float;
4. Fingers wet grip;
5. Untouched water (drops or spray).

FIG. 7 is an exemplary flow chart of possible descriptor implementation along the lines considered in the foregoing. The related procedure is simple, with a low computational cost.

After a check in a step 1000 to the effect that the input values falls within an admissible range for the screen panel S (e.g., the coordinates i, j satisfy basic conditions such as i<height; j<width), the capacitance map CM is scanned as schematically indicated by the block 1002 which represents the step-by-step increments of the coordinates i and j corresponding to the scanning action.

In a step 1004, each element in the capacitive map CM (e.g., Strength [i][j]) is identified as positive (output "yes" from the step 1004) or negative (output "no" from the step 1004).

Then various checks in a row (1006a, 1008a, 1010a if positive and 1006b, 1008b, 1010b if negative) are performed for finding the relative sub-range, while the relative sub-sum is increased (1012a, 1014a, 1016a if positive and 1012b, 1014b, 1016b if negative) and the maximum and minimum global values are updated (at 1018a and 1018b, respectively) so that, once the map CM has been scanned then the global positive sum and the global negative sum may be computed by summing the partial sub-sums.

In one or more embodiments, a decision tree may be used to perform the final classification by resorting to what in the context of machine learning may be referred to as a supervised classifier.

The designation machine learning covers a broad class of computational methods which extract a model of a system from the observation (or the simulation) of the system in certain situations. A model may be represented by a set of exact or approximate relationships between the observed variables of the system. Such a model may permit to predict the behavior of the system in certain situations not yet observed and/or facilitate understanding a behavior already observed. Supervised learning indicates a subset of machine learning methods which derive models in the form of input-output relationships. For instance, supervised learning may permit to identify a mapping from certain input variables to certain output variables on the basis of a given sample of joint observations of the values of these variables. In this context, the (input or output) variables may be called attributes or features, while joint observations of their values may be called objects and the given sample of objects used to infer a model constitute the learning sample.

A concept underlying tree induction algorithms in classification trees is to find a simple tree that has good predictive performance on the learning sample. A decision tree may be a useful and simple supervised learning procedure. Related information may be found e.g., in P. Geurts et al.: "Supervised learning with decision tree-based methods in computational and systems biology", Molecular Biosystems, Vol. 5, No. 12, December 2009, pp. 1593-1605, ISSN 1742-206X.

One or more embodiments may contemplate a learning step performed once for all, essentially as a calibration procedure of the device. For instance, before the device (e.g., a touch screen or apparatus such as a mobile communication terminal including such a device) is made available in the market, it may calibrated for the correct tuning of the data and in the same way the output of the decision tree learning step may be stored as a set of rules in the device/apparatus.

In one or more embodiments, these rules may be a set of if-then-else decisions which will be used on real time, for each capacitive map, to classify the specific situation (wet or dry or untouched water etc.)

For instance, these rules may be defined on the basis of an analysis of possible data variations in a certain device/apparatus, with the results of that analysis confirmed by the rules obtained by a decision tree. This means e.g., that specific rules used for a device with a certain hardware configuration (e.g., sensor pattern, LCD noise specification, panel thickness etc.) may not be suitable to be used "as they are" for a different device. The classifier for such a different device may be subjected to a learning process by using a new training set which will give rise to a new set of rules.

Those of skill in the art will otherwise appreciate that using a decision tree is not a mandatory choice for a classifier as exemplified herein. One or more embodiments may use other supervised learning algorithms such as e.g., k-Nearest Neighbors, artificial neural networks, support vector machines, and so on.

Figure 8:
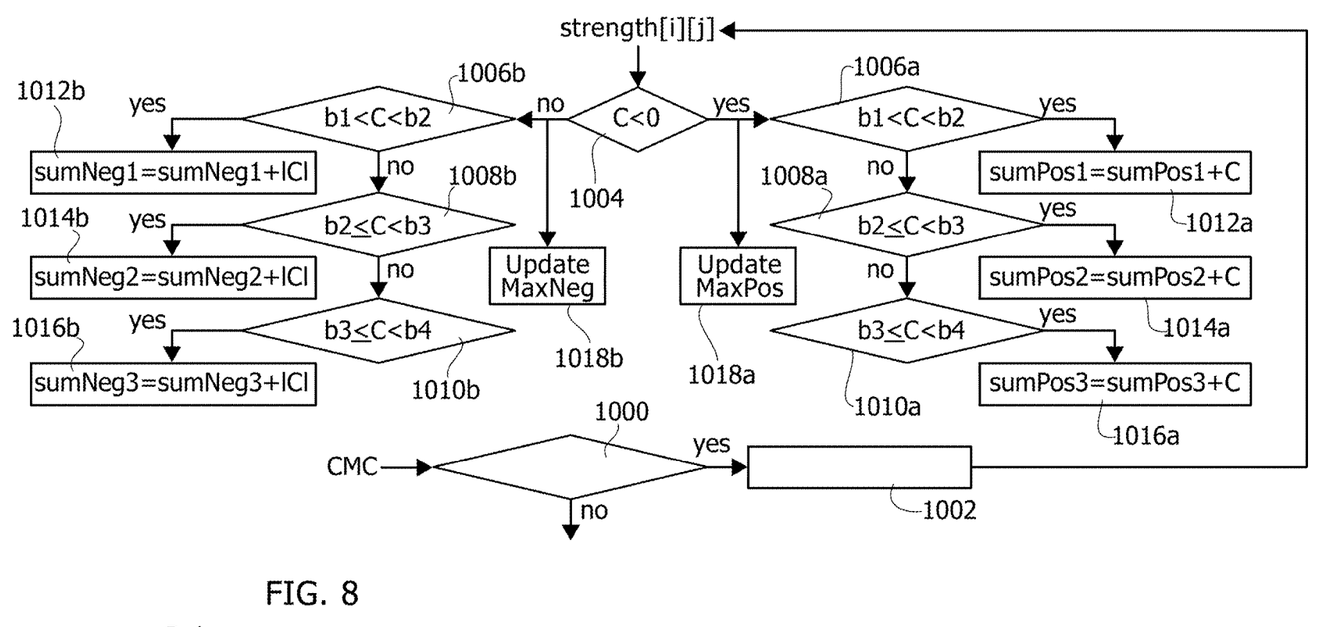
FIG. 8 is a functional block diagram further illustrative of operation of embodiments.

FIG. 8 schematically represents operation of a classifier 202 in receiving a set of descriptors sumP, sumN, maxNeg, maxPos, sumNeg1, sumNeg2, sumNeg3, sumPos1, sumPos2, sumPos3 computed on the current map of capacitances CM as schematically represented in FIG. 7 and in applying to these descriptors a set of rules (as e.g., stored in a portion of a memory included in/associated with the device electronics C) in order to identify one class out of e.g., five possible classes such as Untouched water, Wet fingers float, Wet fingers grip, Dry fingers float, Dry fingers grip.

For instance, for a smartphone such as the TCL Hero 2 smartphone, the following may apply.

If a = b = c = d = e = f = 0 → no touch
else if ($g > mtw_{th1}$ && $mtw_{th3} < h < mtw_{th2}$) → untouched water (drops/spray)
else if ($a < mtw_{th4}$ && $i < mtw_{th4}$ && ($e > mtw_{th2}$ || $f > mtw_{th2}$)) → dry grip (finger/s or stylus)
else if ($a > mtw_{th4}$ && $f < mtw_{th5}$ && $j > mtw_{th4}$ && $j > i$) → dry float (finger/s or stylus)
else if ($i > j$ && $j > mtw_{th4}$) → wet float (finger/s)
else if ($a > mtw_{th4}$ && $f > mtw_{th5}$ && $j > mtw_{th4}$ && $j > i$) → wet grip (finger/s)

where:
a=sumNeg1; d=sumPos1; th1=100;
b=sumNeg2; e=sum Pos2; th2=500;
c=sum Neg3; f=sumPos3; th3=20;
g=maxNeg; h=maxPos; th4=1000;
i=a+b+c; j=d+e+f; th5=5000.

It will be appreciated that one or more embodiments may permit to determine, at least for one and preferably for both of the "grip" and the "float" conditions (screen S held by user and resting on an insulating surface, respectively), dry stylus grip and float operation, e.g., by discriminating, in a "dry" case, finger(s) and stylus.

In one or more embodiments, this may involve discriminating dry grip or dry float conditions, and the circuitry (controller) C may then determine the finger number and positions as well as possible stylus number and positions. In one or more embodiments, the controller may perform such a discrimination (stylus vs. fingers) by having ascertained that one has to deal with a dry condition.

Such a discrimination would be hardly feasible (and practically impossible) in the absence of information as other possible presence of water on the screen, which would militate against discriminating stylus vs. water ghosts. These may produce signals similar to those produced by a stylus (low peak—small "bell").

Based on the classification exemplified herein, the controller C may then be in a position, by acting on the "mutual" map to effectively discriminate between stylus and water ghosts.

Tests performed with one or more embodiments implemented on touch controllers of ST FingerTip family as produced by the applicant company have demonstrated the ability of detecting one to five fingers in the different operative modes float and grip in different conditions of wet and dry. Untouched water and the dry stylus conditions were also covered in testing.

A "drop test" and a "spray test" were also performed in order to test conditions which may be considered from customers to evaluate waterproofing of the device. Moisture on the surface of a touch screen may indeed affect performance as regards detection of fingers and also in respect for correct operation of the device as a whole; performance may in fact vary depending on the amount of moisture and its properties.

The drop test included two steps, namely:
step 1: four drops of water on the surface of touch (screen surface), each drop with 10 mm diameter.
step 2: testing operation of the area without water area (e.g., by "slaloming" between the drops without touching them) and testing it again after water wipe-off (e.g., by sliding one or more fingers on the screen after water is removed).

A check is made after these two steps to see whether the device is blocked (thus requiring be started anew) or continues to operate correctly.

The spray test included three steps, namely:
step 1: spray 3 ml water on the touch surface.
step 2: keep the water on the touch surface for 60 seconds.
step 3: wipe off water then test the function In one or more embodiments, in case of wet/water condition, the electronics C (e.g., firmware) may enter a water multi-touch detection mode or otherwise may continue to work as already done for dry condition. One or more embodiments may offer the advantage of reliably discriminating wet and dry conditions both for grip and float, even if the combinations of wet/dry/grip/float conditions may lead to types of behavior which may not be discriminated easily with other means.

For instance, it was observed that capacitance maps showing a very similar capacitance variation may be produced even for operative modes of the touch screen that are totally different. A capacitive map for five fingers touching a dry display in a float mode and a map for five fingers touching a wet display in a float mode may be a case in point.

A single descriptor may not be able to discriminate between such two different conditions having very similar maps. For instance, a single descriptor, such as the minimum negative value of the map, may not distinguish between these two different conditions because the minimum negative values may be very similar in the two cases (e.g., −1421, −1430), thus leading to detecting false touches.

Using plural descriptors may overcome this drawback, since a set of descriptors may take into account the variation of data inside selected ranges. The possibility of detecting a wet condition makes it possible to avoid that the screen controller should continue to use a "dry" threshold setting with the risk of detecting false touch due to the water: using "dry" settings in the case of wet fingers in a float mode, may lead to the detection of e.g., a false finger touch and false stylus touches.

The various embodiments described above can be combined to provide further embodiments. Aspects of the embodiments can be modified, if necessary to employ concepts of the various patents, applications and publications to provide yet further embodiments.

Without prejudice to the underlying principles, the details and embodiments may vary, even significantly, with respect to what is illustrated herein purely by way of non-limiting example, without thereby departing from the extent of protection.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
producing a capacitance map of a plurality of capacitance values of a capacitive touch screen, the capacitance map being a whole distribution of mutual capacitance data of the capacitive touch screen;
identifying locations of the screen exposed to touch by a user by comparing the plurality of capacitance values against at least one sensing threshold;
classifying each of the plurality of capacitance values of the capacitance map into a plurality of capacitance value ranges;
summing capacitance values in each of the plurality of capacitance value ranges separately;
extracting a plurality of global descriptors based on the summing the capacitance values in each of the plurality of capacitance value ranges, the plurality of global descriptors including at least one global descriptor that is calculated as a sum of capacitance values in one of the plurality of capacitance value ranges;
identifying at least one of a plurality of different operating conditions by applying to the plurality of global descriptors classifier rules; and
electing the at least one sensing threshold as a function of the at least one operating condition identified wherein the extracting the plurality of global descriptors includes selecting at least one of the sums,
wherein the summing the capacitance values in each of the plurality of capacitance value ranges separately includes:
in response to that each of the plurality of capacitance values is a positive value, determining:
a sum of positive capacitance values in a first positive range of the capacitance map;
a sum of positive capacitance values in a second positive range of the capacitance map; and
a sum of positive values for the capacitance values in a third positive range of the capacitance map; and
in response to that each of the plurality of capacitance values is a negative value, determining:
a sum of negative capacitance values in a first negative range of the capacitance map;
a sum of negative capacitance values in a second negative range of the capacitance map; and
a sum of negative capacitance values in a third negative range of the capacitance map.

2. The method of claim 1 wherein the capacitance map is a mutual capacitance map of the touch screen.

3. The method of claim 1, further comprising producing the capacitance map as a map of capacitance strength values based on the following:

Strength=Baseline−RawData where:
Baseline is the capacitance value at a location of the screen when untouched; and
RawData is a capacitance variation due to a conductor element at the location of the screen.

4. The method of claim 1 wherein the plurality of different operating conditions comprise:
user's fingers dry and screen held by user;
stylus dry and screen held by user;
stylus dry and screen resting on insulating surface;
user's fingers dry and screen resting on insulating surface;
user's fingers wet and screen held by user;
user's fingers wet and screen resting on insulating surface; and
untouched water on screen.

5. The method of claim 1 wherein:
the plurality of different operating conditions includes, at least for the screen held by a user or the screen resting on an insulating surface, dry operating conditions for user's fingers and for a stylus; and
wherein the method includes discriminating between finger operation and stylus operation in the dry operating conditions.

6. A device, comprising:
a capacitive touch screen; and
electronic circuitry coupled to the screen, the circuitry configured to:
produce a capacitance map of a plurality of capacitance values for the screen;
classify each of the plurality of capacitance values of the capacitance map into a plurality of capacitance value ranges;
sum capacitance values in each of the plurality of capacitance value ranges separately;
extract global descriptors from the capacitance map based on the summing the capacitance values in each of the plurality of capacitance value ranges, the global descriptors including at least one global descriptor that is calculated as a sum of capacitance values in one of the plurality of capacitance value ranges;
apply to the global descriptors a set of classifier rules to identify one of a plurality of different operating conditions;
elect at least one sensing threshold based on the identified operating condition;
compare the plurality of capacitance values against the at least one sensing threshold; and
identify locations of the screen exposed to touch by a user based on the comparing,
wherein the summing the capacitance values in each of the plurality of capacitance value ranges separately includes:
in response to that each of the plurality of capacitance values is a positive value, determining:
a sum of positive capacitance values in a first positive range of the capacitance map;
a sum of positive capacitance values in a second positive range of the capacitance map; and
a sum of positive values for the capacitance values in a third positive range of the capacitance map; and in response to that each of the plurality of capacitance values is a negative value, determining:
a sum of negative capacitance values in a first negative range of the capacitance map;
a sum of negative capacitance values in a second negative range of the capacitance map; and
a sum of negative capacitance values in a third negative range of the capacitance map.

7. The device of claim 6 wherein the plurality of different operating conditions includes operating conditions selected from:
user's fingers dry and screen held by user;
stylus dry and screen held by user;
stylus dry and screen resting on insulating surface;
user's fingers dry and screen resting on insulating surface;
user's fingers wet and screen held by user;
user's fingers wet and screen resting on insulating surface; and
untouched water on screen.

8. The device of claim 6 wherein the capacitance map is a mutual capacitance map of the touch screen.

9. The device of claim 6 wherein the capacitive touch screen includes a plurality of capacitive sensors and wherein the electronic circuitry is further configured to produce the capacitance map of capacitance values for the screen as a map of capacitance strength values for each capacitive sensor based on the following equation:

Strength=Baseline−RawData wherein Baseline is the capacitance value of the capacitive sensor in a condition where the capacitive sensor is untouched, and RawData is a capacitance variation of the capacitive sensor due to a presence of a conductive element proximate the capacitive sensor.

10. An electronic device, comprising:
a capacitive touch screen including a plurality of capacitive sensors;
a touch controller coupled to the capacitive touch screen, the touch controller configured to:
generate a capacitance map of a plurality of capacitance values of the plurality of capacitive sensors of the capacitive touch screen;
classify each of the plurality of capacitance values of the capacitance map into a plurality of capacitance value ranges;
sum capacitance values in each of the plurality of capacitance value ranges separately;
extract descriptors from the capacitance map based on the summing the capacitance values in each of the plurality of capacitance value ranges, the descriptors indicating one of a plurality of different operating conditions of the capacitive touch screen and including at least one global descriptor that is calculated as a sum of the capacitance values in one of the plurality of capacitance value ranges of the capacitance map;
apply to the descriptors a set of classifier rules to identify the one of a plurality of different operating conditions;
compare the plurality of capacitance values against at least one sensing threshold selected as a function of the identified one of the plurality of different operating conditions; and
identify locations of the screen exposed to touch by a user based on the comparing,
wherein the summing the capacitance values in each of the plurality of capacitance value ranges separately includes:

in response to that each of the plurality of capacitance values is a positive value, determining:
- a sum of positive capacitance values in a first positive range of the capacitance map;
- a sum of positive capacitance values in a second positive range of the capacitance map; and
- a sum of positive values for the capacitance values in a third positive range of the capacitance map; and in response to that each of the plurality of capacitance values is a negative value, determining:
- a sum of negative capacitance values in a first negative range of the capacitance map;
- a sum of negative capacitance values in a second negative range of the capacitance map; and
- a sum of negative capacitance values in a third negative range of the capacitance map.

11. The electronic device of claim 10 wherein the plurality of different operating conditions include:
- user's fingers dry and screen held by user;
- stylus dry and screen held by user;
- stylus dry and screen resting on insulating surface;
- user's fingers dry and screen resting on insulating surface;
- user's fingers wet and screen held by user;
- user's fingers wet and screen resting on insulating surface; and
- untouched water on screen.

12. The electronic device of claim 10 wherein the capacitive touch screen comprises a mutual capacitance touch screen.

13. The electronic device of claim 10 wherein the electronic circuitry comprises one of smart phone and table computer circuitry.

14. The electronic device of claim 10 wherein the electronic circuitry is further configured to generate the capacitance map of the plurality of capacitance values including a capacitive strength value for each capacitive sensor of the capacitive touch screen, the capacitive strength value Strength being equal to (Baseline−RawData), where Baseline is the capacitance value of the capacitive sensor in an untouched condition and RawData is the capacitance value of the capacitive sensor in the presence of a conductive element proximate the capacitive sensor.

* * * * *